(12) United States Patent
Hanasaka

(10) Patent No.: US 9,004,817 B2
(45) Date of Patent: Apr. 14, 2015

(54) SOIL REMEDIATION SYSTEMS AND METHODS

(75) Inventor: Fumihiro Hanasaka, Kyoto (JP)

(73) Assignee: Empire Technology Development LLC, Wilmington, DE (US)

( * ) Notice: Subject to any disclaimer, the term of this patent is extended or adjusted under 35 U.S.C. 154(b) by 384 days.

(21) Appl. No.: 13/142,372

(22) PCT Filed: Dec. 21, 2010

(86) PCT No.: PCT/JP2010/007395
§ 371 (c)(1),
(2), (4) Date: Jun. 27, 2011

(87) PCT Pub. No.: WO2012/085964
PCT Pub. Date: Jun. 28, 2012

(65) Prior Publication Data
US 2012/0263538 A1 Oct. 18, 2012

(51) Int. Cl.
*B09C 1/06* (2006.01)
*B01D 53/00* (2006.01)
*H05B 6/10* (2006.01)

(52) U.S. Cl.
CPC . *H05B 6/107* (2013.01); *B09C 1/06* (2013.01)

(58) Field of Classification Search
USPC ......... 405/128.85, 128.7, 128.75, 128.8, 130;
432/14; 110/220, 236, 246, 346;
219/635, 690, 678, 679, 700–701,
219/695–697, 750; 95/14, 149, 227;
202/158, 185.1; 203/39; 422/173, 174;
134/25.1, 31, 40; 96/243, 251
See application file for complete search history.

(56) References Cited

U.S. PATENT DOCUMENTS

| | | | | |
|---|---|---|---|---|
| 4,889,484 A | * | 12/1989 | Przewalski | 432/103 |
| 4,993,943 A | * | 2/1991 | Norris et al. | 432/107 |
| 5,072,674 A | * | 12/1991 | Noland et al. | 110/346 |
| 5,176,087 A | * | 1/1993 | Noland et al. | 110/346 |
| 5,184,950 A | * | 2/1993 | Fraysse et al. | 432/13 |
| 5,221,159 A | | 6/1993 | Billings et al. | |
| 5,236,282 A | * | 8/1993 | Teasel et al. | 405/128.7 |
| 5,240,570 A | * | 8/1993 | Chang et al. | 204/515 |
| 5,242,246 A | * | 9/1993 | Manchak et al. | 405/128.85 |
| 5,245,120 A | * | 9/1993 | Srinivasachar et al. | 588/256 |
| 5,265,977 A | * | 11/1993 | Weirich et al. | 405/128.9 |
| 5,613,452 A | * | 3/1997 | Marchesi et al. | 110/215 |

(Continued)

FOREIGN PATENT DOCUMENTS

| CA | 2027474 A1 | 4/1991 |
|---|---|---|
| CA | 2468720 A1 | 7/2003 |

(Continued)

OTHER PUBLICATIONS

International Search Report and Written Opinion, PCT/JP2010/007395, dated Mar. 29, 2011.

(Continued)

*Primary Examiner* — Doug Hutton, Jr.
*Assistant Examiner* — Patrick Lambe
(74) *Attorney, Agent, or Firm* — Pepper Hamilton LLP

(57) ABSTRACT

Soil remediation systems containing at least one heating device configured to heat contaminated soil for remediation and at least one storage tank configured to contain an ionic liquid are described. The soil contaminated by a volatile compound is heated by the heating device to vaporize the volatile compound, which is trapped by the ionic liquid.

24 Claims, 7 Drawing Sheets

(56) References Cited

U.S. PATENT DOCUMENTS

| | | | |
|---|---|---|---|
| 5,710,360 A * | 1/1998 | Self et al. | 588/321 |
| 5,919,038 A * | 7/1999 | Labelle et al. | 432/14 |
| 6,000,882 A * | 12/1999 | Bova et al. | 405/128.85 |
| 6,840,712 B2 * | 1/2005 | Satchwell et al. | 405/128.8 |
| 7,513,061 B2 * | 4/2009 | Hirayama et al. | 34/247 |
| 7,695,669 B2 * | 4/2010 | Araki et al. | 264/345 |
| 8,348,551 B2 * | 1/2013 | Baker et al. | 405/128.85 |
| 2003/0228196 A1 | 12/2003 | Satchwell et al. | |
| 2005/0090704 A1 * | 4/2005 | Roettger et al. | 585/860 |
| 2006/0008392 A1 * | 1/2006 | Graham et al. | 422/168 |
| 2006/0094620 A1 * | 5/2006 | Jordan et al. | 510/286 |
| 2008/0069640 A1 * | 3/2008 | Haemers et al. | 405/128.85 |
| 2008/0175670 A1 * | 7/2008 | Richter | 405/128.4 |
| 2009/0084290 A1 * | 4/2009 | Ichihara et al. | 106/802 |

FOREIGN PATENT DOCUMENTS

| | | |
|---|---|---|
| CN | 1635982 A | 7/2005 |
| DE | 69005411 T2 | 4/1994 |
| DE | 10206808 A1 | 8/2003 |
| EP | 0423039 A1 | 4/1991 |
| EP | 1476408 B1 | 3/2007 |
| FR | 2 653 044 | 4/1991 |
| JP | 03-178675 A | 8/1991 |
| JP | 2004-290953 A | 10/2004 |
| JP | 2005-527501 A | 9/2005 |
| JP | 2006-198512 A | 8/2006 |
| JP | 2006198512 A | 8/2006 |
| WO | WO 98/15363 A1 | 4/1998 |
| WO | WO 03/055615 A1 | 7/2003 |
| WO | WO03/055615 A1 | 7/2003 |
| WO | WO 03/070667 A1 | 8/2003 |

OTHER PUBLICATIONS http://www.spc.co/jp/heating/tec_001.htm, High Frequency Induction Heating SPC Electronics (English machine translation) printed from internet on Jun. 17, 2011.

http://www.alonics.co/jp/Amerithermcontent/aboutinduction2.html, Precision Induction Heating, Ameritherm Inc. (English machine translation) printed from internet on Jun. 17, 2011.

http://www.dhf.co/jp.eng/ih/products/fine-particle.html, Dai-Ichi High Frequency Co., Ltd. (English machine translation) printed from internet on Jun. 24, 2011.

"Materials Characterization Paper in Support of the Proposed Rulemaking: Identification of Nonhazardous Secondary Materials That Are Solid Waste Spent Solvents and Related Materials" Mar. 18, 2010, *Spent Solvents and Related Materials*.

Chinese Search Report dated Jul. 18, 2014 for corresponding application CN 201080070226.9.

Chinese Office Action dated Jul. 18, 2014 for corresponding application CN 201080070226.9.

\* cited by examiner

SOIL REMEDIATION SYSTEMS AND METHODS

CROSS REFERENCE TO RELATED APPLICATION

This application is a U.S. National Stage Application filed under 35 USC § 371 and claims priority to PCT Application No. PCT/JP2010/007395, filed Dec. 21, 2010.

TECHNICAL FIELD

Systems and methods for remediating contaminated soil, and more particularly systems and methods for volatilizing substances contained in soil and collecting the substances for reuse using an absorbing liquid are disclosed.

BACKGROUND ART

Soil remediation techniques have become increasingly important due to deterioration of soil environments, especially in the regions and places where development activities are taking place. Depending on the nature of contaminated soil, an appropriate technique may be used. For example, an electrolysis reduction method may be used for remediation of heavy metal-contaminated soil. In an electrolysis reduction method, contaminated soil is slurried with an electrolysis solution (e.g., hydrochloric acid), and then a voltage is applied to electrodes arranged in the resulting slurry whereby a heavy metal (e.g., lead) is deposited on and collected from one of the electrodes.

Such a soil remediation technique using the electrolysis reduction method, however, cannot be used for soil contaminated by volatile organic materials such as halogenated compounds. Accordingly, remediation of hazardous organics-contaminated soil may need a technique of, for example, heating contaminated soil at a high temperature, or alternatively causing chemical reactions of the hazardous organics, to decompose the hazardous organic compounds into harmless compounds.

Accordingly, a soil remediation technique capable of recycling or reusing the volatile organic compounds extracted from the contaminated soil would prove to be widely useful.

DETAILED DESCRIPTION

Reference will now be made in detail to embodiments, examples of which are illustrated in the accompanying drawings. The drawings are intended to be explanatory and may not be drawn to scale. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments.

The present disclosure describes techniques, devices, apparatuses, systems, and methods for soil remediation including, but not limited to, heating contaminated soil by a heating device to vaporize at least one volatile substance, and introducing the vaporized volatile substance into an absorbing liquid contained in a storage tank to trap the vaporized volatile substance. Further, the present disclosure describes techniques, devices, apparatuses, systems and methods for extraction including, but not limited to, removing the volatile substance from the absorbing liquid.

Figure 1:
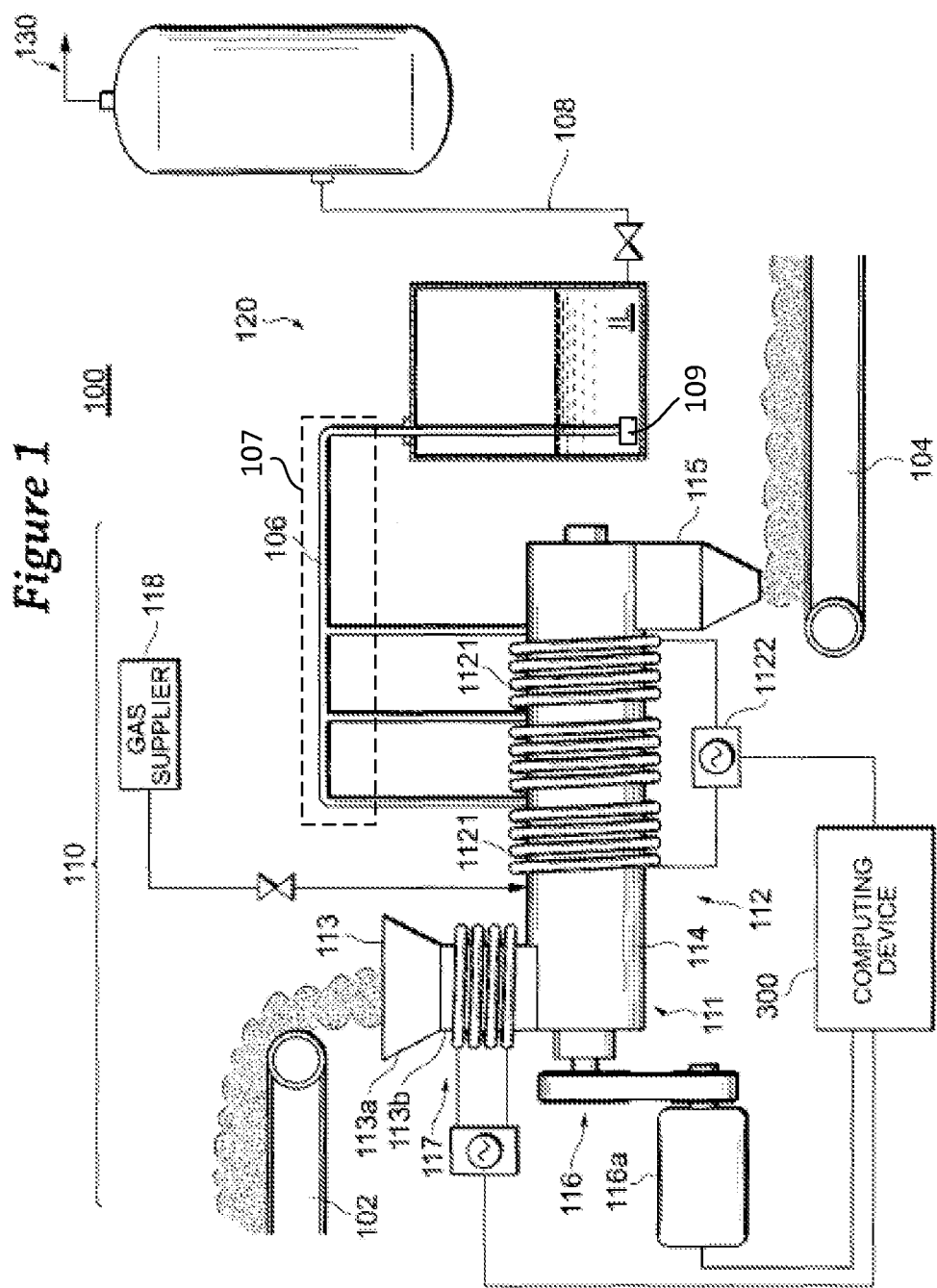
FIG. 1 is a schematic illustration showing an example of a soil remediation system arranged in accordance with the present disclosure.

FIG. 1 is a schematic illustration showing an example of a soil remediation system. Referring to FIG. 1, a soil remediation system 100 may include at least one vaporization apparatus 110 for configured to vaporize at least one volatile substance contained in soil and at least one storage tank 120 configured to contain at least one absorbing liquid for trapping or collecting the vaporized volatile substance. Further, the soil remediation system 100 may include an distillation apparatus 130 configured to distill off the volatile substance collected from the absorbing liquid. The soil re-mediation system 100 may be controlled by a computing device 300. The soil re-mediation system 100 may be located at or near the soil to be treated, or alternatively, at a location distant from the soil to be treated. The system may be fixed in its location, or may be portable. Portable systems may be mounted on a variety of vehicles such as trucks, trains, trailers, wagons, airplanes, helicopters, boats, barges, submarines, and so on. The soil for remediation may contain one or more volatile substances or contaminants. Volatile substances may be organic compounds. Volatile substances may be hazardous or non-hazardous. Examples of organic compounds include, but are not limited to, 1,2-dichloroethane, 1,1-dichloroethylene, 1,2-dichloroethylene, 1,3-dichloropropene, dichloromethane, tetrachloroethylene, 1,1,1-trichloroethane, 1,1,2-trichloroethane, trichloroethylene, carbon tetrachloride, tetrachloroethylene, dioxin, and polychlorobiphenyls (PCBs). Further, some aromatic hydrocarbon compounds such as benzene and toluene are also considered to be hazardous substances. The soil remediation system 100 may operatively communicate with an incoming conveyor 102 and an outgoing conveyor 104 in order to deliver the soil.

Figure 2:
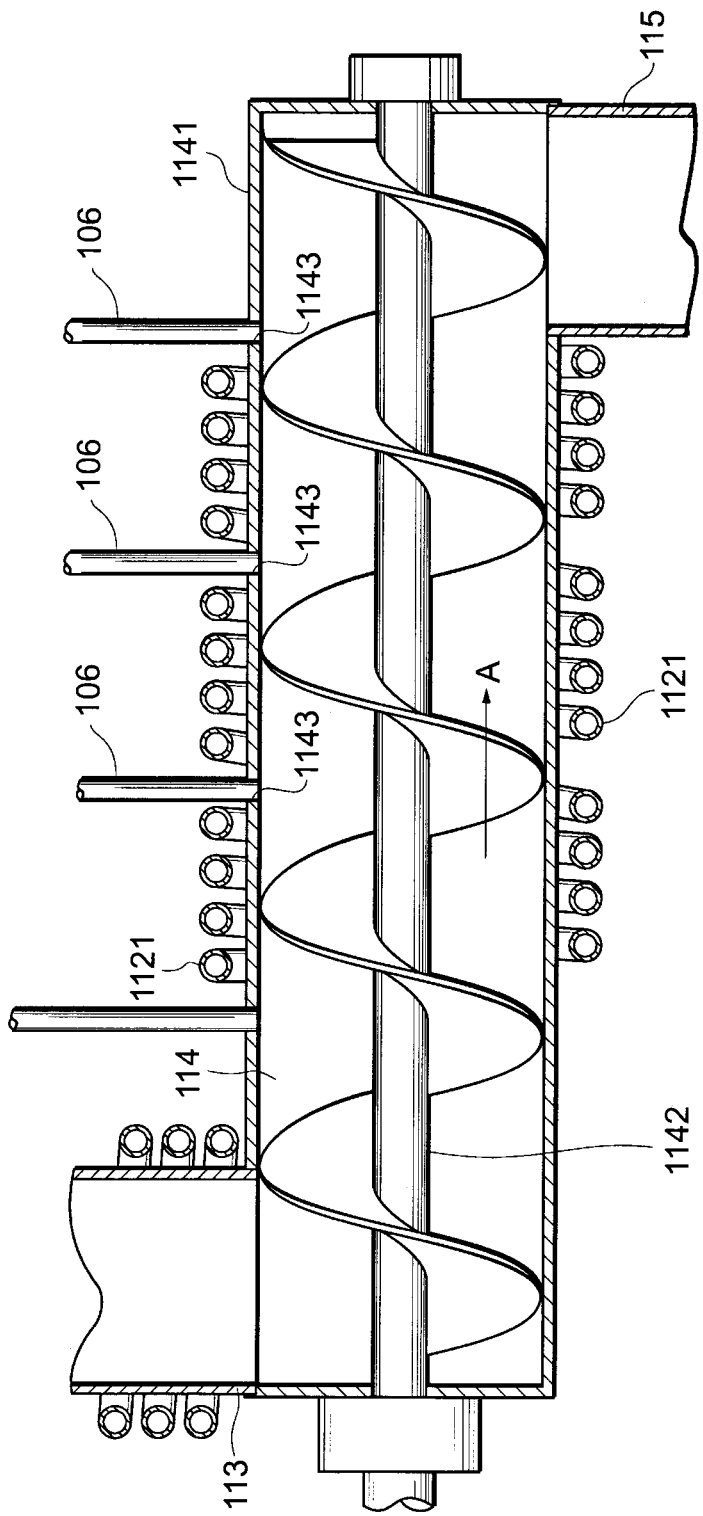
FIG. 2 is a schematic illustration showing an example of a conveyor of a soil re-mediation system arranged in accordance with the present disclosure.

The vaporization apparatus 110 may include a conveyor 111 and a heating device 112. In the present disclosure, the conveyor 111 may be, but not limited to, a screw conveyor or a belt conveyor. In another example, an extruder may be used, instead of the conveyor 111, to convey the soil. The soil may be extruded against an extrusion plate of the extruder. The conveyor 111 may include an entry port 113, a conveyor body 114, a discharge port 115, and a power transmission mechanism 116. The entry port 113 typically includes a hopper 113a configured to receive the soil from the incoming conveyor 102. A portion of the entry port 113 may function as a pre-heat chamber 113b to pre-heat the soil before the soil is introduced into the conveyor body 114. The entry port 113 may further include a soil cutter (not shown) to grain the clump of the soil. The entry port 113 may further include a mesh or other grading devices to separate the soil by particle size. The entry port 113 may be configured to exclude rocks, manmade debris, or other large particles. The opposite end of the entry port 113 communicates with an inlet of the conveyor body 114. As shown in FIG. 2, the conveyor body 114 may include a structural enclosure 1141 in the form of a hollow duct, and a conveyor screw 1142 arranged therein. The length, diameter, and other dimensions of the conveyor body 114 may generally be any length, and can be selected according to the desired scale and throughput of the vaporization apparatus. In an example, the length of the conveyor body 114 may be, but not limited to, about 1 meter, about 2 meters, about 3 meters, about 4 meters, about 5 meters, and so on; and the internal diameter of the conveyor body 114 may be, but not limited to, about 1 meter, about 2 meters, about 3 meters, about 4 meters, about 5 meters, and so on. Although not shown, the conveyor screw 1142 may be supported by bearings. The screw pitch of the conveyor screw 1142 is not limited. Although the typical conveyor screw is shown in FIG. 2, a various types of conveyor screws may be used. For example, a centreless-typed screw may be used. In another example, the conveyor screw 1142 may be configured by a ribbon screw or a cut flight screw. An upper portion of the enclosure 1141 of the conveyor body 114 may be perforated along the conveying direction thereof with one or more holes 1143, which are hermitically connected to a pipe 106 to deliver the vaporized substance, together with a carrier gas, to the storage tank 120.

Returning to FIG. 1, the power transmission mechanism 116 may be configured to include a motor 116a and to drive the conveyor screw 1142 to axially rotate. The rotation of the conveyor screw 1142 allows the soil introduced from the entry port 113 to travel in a direction of the arrow A (see also FIG. 2). The linear flow rate of the soil through the conveyor body 114 may generally be any rate, and can be selected according to the desired scale and throughput of the vaporization apparatus. An example of the linear flow rate of the soil may be, but not limited to, about 0.1 meter/minute, about 0.5 meter/minute, or about 1 meter/minute. The soil conveyed through the conveyor body 114 is discharged from the discharge port 115, and may then further be delivered to a desired destination by the outgoing conveyor 104. The discharged soil may be used as backfill. Alternatively, the soil may further be introduced into another soil remediation system to collect another substance.

The heating device 112 is configured to heat the soil being conveyed through the conveyor body 114. The residence time of the soil in the conveyor body 114 can easily be calculated by dividing the length by the linear flow rate, and generally can be any length of time. For example, in a case where the length of the conveyor body 114 is about 3 meters and the flow rate is about 0.1 meter/minute as discussed above, the soil traveling through the conveyor body 114 may be heated for about 30 minutes. The residence time may vary according to the size and scale of the vaporization apparatus, the desired throughput, the volatile compounds to be removed, and the degree of contamination of the soil. In the present invention, the heating device 112 may be, but not limited to, an induction heating device. Induction heating devices are capable of heating an electrically conductive object by electromagnetic induction. In a case where an object to be heated is an insulating material, the induction heating devices may heat a susceptor electromagnetically, thereby allowing the insulating material to be heated by heat transferred from the susceptor. The susceptor may be configured from tungsten or graphite. Typically, soil may include iron, and carbon and its allotropes, and thus they may function as the susceptor in the introduction heating process. Susceptor materials may be added to the soil prior to treatment. This, however, does not mean that the induction heating device in the present disclosure excludes arranging of a susceptor herein. In a non-limiting example, a susceptor may be provided on a surface of the shaft of the conveyor screw 1142. In another example, a gas burner may be used as the heating device 112. The gas burner may heat a part or whole of the conveyor body 114 under control of the computing device 300. Alternatively, the soil may be heated with electrically-heated wiring located in the conveyor body 114.

The heating device 112 may include a work coil 1121 and an AC power source 1122. The work coil 1121 may be in the form of a continuous tube or pipe, which may be made of electrically-conductive metal such as copper. The work coil 1121 is wounded around an outer surface of the conveyor body 114. It should be understood that a plurality of work coils 1121 may be provided. The work coil 1121 is electrically connected with the AC power source 1122. Although not shown in FIG. 1, the work coil 1121 may also be connected with a cooling device so that a cooling medium, such as water, can circulate through the inside of the work coil 1121. The circulating cooling medium may remove Joule heat from the work coil 1121, thereby preventing electrical resistivity of the work coil 1121 from adversely increasing.

A heating temperature of the heating device 112 may be selected depending on the boiling point of the volatile substance to be removed from the soil. An example of the heating temperature is in a range of about 100 to about 150 degrees Celsius, about 150 to about 200 degrees Celsius, or about 200 to 250 degrees Celsius. For example, the boiling point of 1,2-dichloroethane is known to be about 83.5 degrees Celsius. Thus, in order to remove 1,2-dichloroethane from the soil, the heating temperature may be selected at a temperature at or above the volatile substance's boiling point, e.g., about 100 degrees Celsius. Alternatively, removal of 1,1,2-trichloroethane from soil may be performed with a heating temperature of about 125 degrees Celsius, above the substance's 114 degrees Celsius boiling point.

The AC power supply 1122 is configured to supply a high-frequency alternating current to the work coil 1121. The power output of the AC power supply 1122 as well as the frequency of AC used may be selected depending on various factors, such as the volume or the nature of the soil, or coupling between the work coil and the soil. An example of the range of the power output may be, but not limited to, about 1 kW-about 3000 kW, and an example of the range of the frequency of AC may be, but not limited to, about 1 kHz-about 300 kHz.

In some embodiments, the vaporization apparatus 110 may further include a device for pre-heating the soil. In the present disclosure, a pre-heating device 117 is mounted on the pre-heat chamber 113b of the entry port 113. The pre-heating device 117 may be configured to pre-heat the soil by electromagnetic induction. The pre-heating temperature by the pre-heating device 117 may be at a temperature below the boiling point of the volatile substance contained in the soil.

In some embodiments, the vaporization apparatus 110 may further include a gas supplier 118 configured to supply a carrier gas to the conveyor body 114. The carrier gas may be composed of an inert gas, such as nitrogen or argon. The carrier gas may contain molecular oxygen ($O_2$) or lack molecular oxygen. The carrier gas may reduce or prevent oxidation of the volatile substance in the conveyor body 114. If the volatile substance is susceptible to oxidation, having a low or zero concentration of molecular oxygen in the carrier gas may reduce or eliminate the oxidation. The carrier gas may be heated sufficiently in order to prevent the internal temperature of the conveyor body 114 from significantly decreasing. In some cases, the carrier gas may be heated to the same or similar temperature as the temperature of the conveyor body 114. The amount and flow rate of carrier gas may vary widely according to the size and scale of the vaporization apparatus 110. An example of an amount of the carrier gas supplied may be, but not limited to, about 100 mL/minute, about 200 mL/minute, about 300 mL/minute, about 400 mL/minute, or about 500 mL/minute. The mixed gas of the vaporized volatile substances and the carrier gas may be routed to the storage tank 120 via the pipe 106. In order to maintain the temperature of the vaporized volatile substance, a heater or insulation 107 may be installed on all or a portion of the pipe 106.

The storage tank 120 is configured to contain an ionic liquid ("IL") to function as an absorbing liquid for the vaporized volatile substance. The storage tank 120 may be connected in gas connection with conveyor body 114. The pipe 106 extending from the conveyor body 114 is arranged to extend to or into the storage tank 120. The pipe 106 may include a sparger 109 at the distal end thereof to efficiently dissolve the vaporized target substance.

An ionic liquid is a salt in the liquid state which has a melting point at, or below, room temperature. Ionic liquids may contain at least one cation and at least one anion. The miscibility of ionic liquids with water or organic solvents may vary with side chain lengths on a cation and with choice of anion. Many ionic liquids may have low combustibility, excellent thermal stability and wide liquid regions. Ionic liquids exhibit low vapor pressure. Thus, use of ionic liquids may reduce or eliminate the necessity of considering dissolution into gas phases and supercritical fluid phases, and emission to environments.

Further, gas absorption by ionic liquids may be a physical absorption process. Thus, a target gas may easily be captured or trapped in a manner of bringing into contact with an ionic liquid, and subsequently extracted under reduced pressure. In addition, the ionic liquid from which the gas has been extracted may be reused or recycled.

A wide variety of ionic liquids may be used as the absorbing liquid because ionic liquids typically have melting points lower than the boiling point of a volatile substance. Further, the ionic liquid may be selected so as not to dissolve the carrier gas to be used. In the present disclosure, the ionic liquid may include, for example, imidazolium salt, pyridinium salt, pyrrolidinium salt, ammonium salt, and phosphonium salt. Specific examples of ionic liquids include 1-butyl-3-methylimidazolium hexafluorophosphate [BMIm][$PF_6$], 1-butyl-3-methylimidazolium bis(trifluoromethylsulfonyl)imide [BMIm][TFSI], 1-hexyl-3-methylimidazolium hexafluorophosphate [HMIm][$PF_6$], 1-hexyl-3-methylimidazolium tetrafluoroborate [HMIm][$BF_4$], 1-hexyl-3-methylimidazolium trifluoromethanesulfonate [HMIm][$CF_3SO_3$], 1-hexyl-3-methylimidazolium bis(trifluoromethylsulfonyl)imide [HMIm][TFSI], 1-octyl-3-methylimidazolium hexafluorophosphate [OMIm][$PF_6$], 1-octyl-3-methylimidazolium tetrafluoroborate [OMIm][$BF_4$], 1-butyl-2,3-dimethylimidazolium tetrafluoroborate [BDMIm][$BF_4$], 1-butyl-2,3-dimethylimidazolium trifluoromethanesulfonate [BDMIm][$CF_3SO_3$], 1-hexyl-2,3-dimethylimidazolium tetrafluoroborate [HDMIm][$BF_4$], 1,3-diallylimidazolium bis(trifluoromethylsulfonyl)imide [AAIm][TFSI], 1-butylpyridinium tetrafluoroborate [BPy][$BF_4$], 1-hexylpyridinium tetrafluoroborate [$C_6$Py][$BF_4$], 1-butyl-1-methylpyrrolidinium bis(trifluoromethylsulfonyl)imide [BMPyrr][TFSI], 1-butyl-1-methylpyrrolidinium trifluoromethanesulfonate [BMPy][$CF_3SO_3$], N,N,N,N-dimethyl-methyl-2-methoxyethylammonium tetrafluoroborate [DMMMoeAM][$BF_4$], and tricyclohexyl(tetradecyl)phosphonium bis(trifluoromethylsulfonyl)imide [TCTDP] [TFSI].

The ionic liquid containing the volatile substance may be disposed of without further processing, or the volatile substance may be removed from the ionic liquid. The distillation apparatus 130 is configured to distil the volatile substance from the absorbing ionic liquid in a distillation process. The term "distillation," as used throughout the specification, is intended to include any types of processes of separating mixtures based on differences in their volatilities from a liquid mixture. Various known distillation techniques may be used for the soil remediation system arranged in accordance with the present disclosure. An example of a schematic configuration of the distillation apparatus will be discussed later with reference to FIG. 5.

Figure 3:
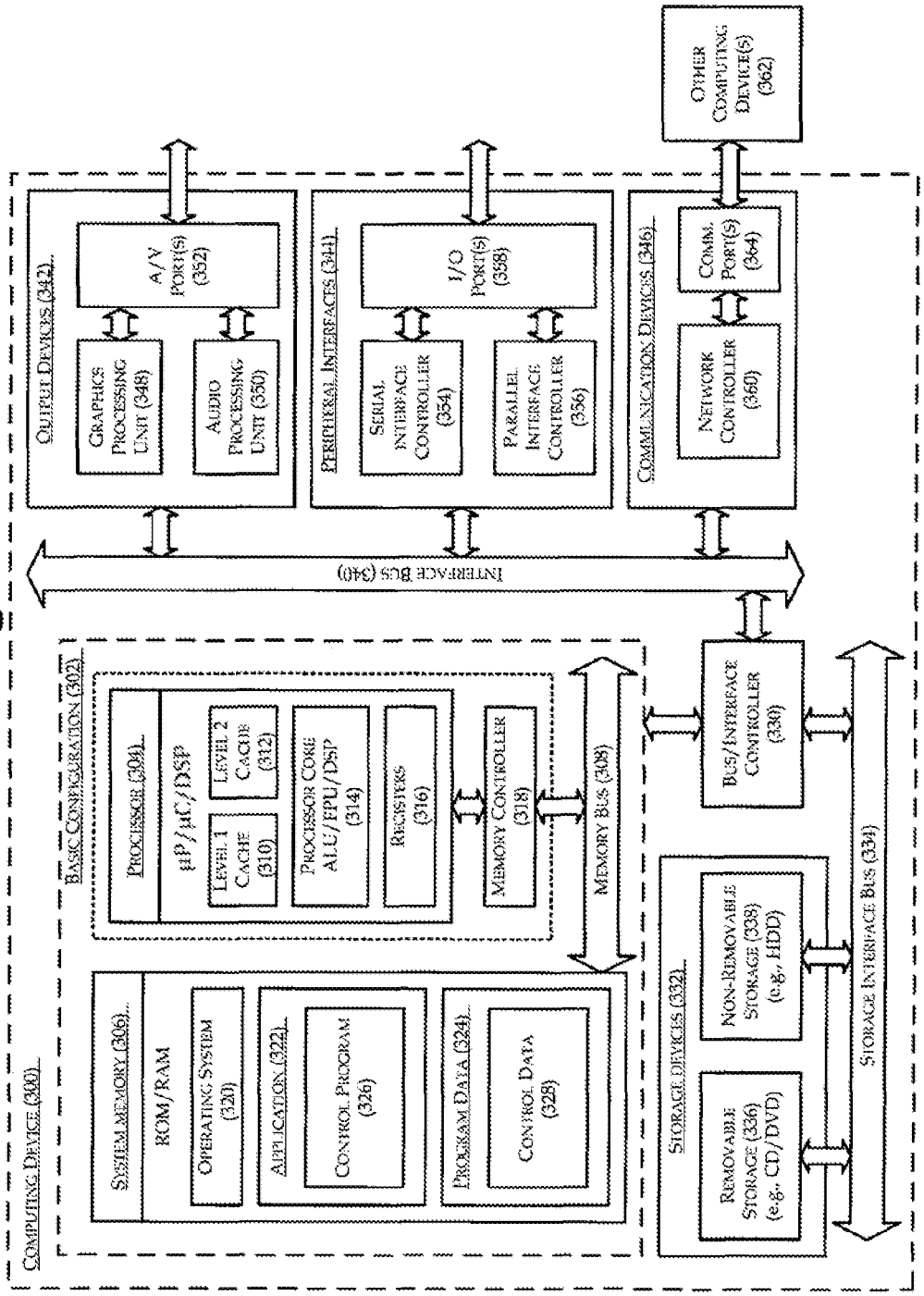
FIG. 3 is a block diagram illustrating an example of a computing device that is arranged for a soil remediation system in accordance with the present disclosure.

FIG. 3 is a block diagram illustrating an example of the computing device 300 that is arranged for a soil remediation system in accordance with the present disclosure. In a very basic configuration 302, the computing device 300 typically includes one or more processors 304 and a system memory 306. A memory bus 308 may be used for communicating between processor 304 and the system memory 306.

Depending on the desired configuration, the processor 304 may be of any type including, but not limited to, a microprocessor (micro-P), a microcontroller (micro-C), a digital signal processor (DSP), or any combination thereof. The processor 304 may include one more levels of caching, such as a level one cache 310 and a level two cache 312, a processor core 314, and registers 316. An example processor core 314 may include an arithmetic logic unit (ALU), a floating point unit (FPU), a digital signal processing core (DSP Core), or any combination thereof. An example memory controller 318 may also be used with processor 304, or in some implementations memory controller 318 may be an internal part of processor 304.

Depending on the desired configuration, the system memory 306 may be of any type including, but not limited to, a volatile memory (such as RAM), non-volatile memory (such as ROM, flash memory, etc.) or any combination thereof. The system memory 306 may include an operating system 320, one or more applications 322, and program data 324. An application 322 may include a control program 326 that is arranged to control the soil remediation system 100. The control program 324 may select, for example, a delivery rate of the conveyor 111. Further, the control program 324 may control a heating temperature by the heating device 112. The program data 324 may include control data 328 that may be useful for selecting the delivery rate as well as the heating temperature as is described herein. In some embodiments, the application 322 may be arranged to operate with the program data 324 on the operating system 320 such that the selected heating temperature is adjusted and maintained. This described basic configuration 302 is illustrated in FIG. 3 by those components within the inner dashed line.

The computing device 300 may have additional features or functionality, and additional interfaces to facilitate communications between the basic configuration 302 and any required devices and interfaces. For example, a bus/interface controller 330 may be used to facilitate communications between the basic configuration 302 and one or more data storage devices 332 via a storage interface bus 334. Data storage devices 332 may be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. An example computer storage media may include volatile and nonvolatile, removable and non-removable media implemented in any method or technology for storage of information, such as computer readable instructions, data structures, program modules, or other data.

The system memory 306, removable storage devices 336 and non-removable storage devices 338 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store desired information and which may be accessed by computing device 300. Any such computer storage media may be part of the computing device 300.

The computing device 300 may also include an interface bus 340 for facilitating communication from various interface devices (e.g., output devices 342, peripheral interfaces 344, and communication devices 346) to the basic configuration 302 via a bus/interface controller 330. Example output devices 342 include a graphics processing unit 348 and an audio processing unit 350, which may be configured to communicate with various external devices such as a display or speakers via one or more A/V ports 352. Example peripheral interfaces 344 include a serial interface controller 354 or a parallel interface controller 356, which may be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which may be arranged to facilitate communications with one or more other computing devices 362 over a network communication link via one or more communication ports 364.

The network communication link may be one example of a communication media. The communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, the communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 300 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 may also be implemented as a personal computer including both laptop computer and non-laptop computer configurations.

Figure 4:
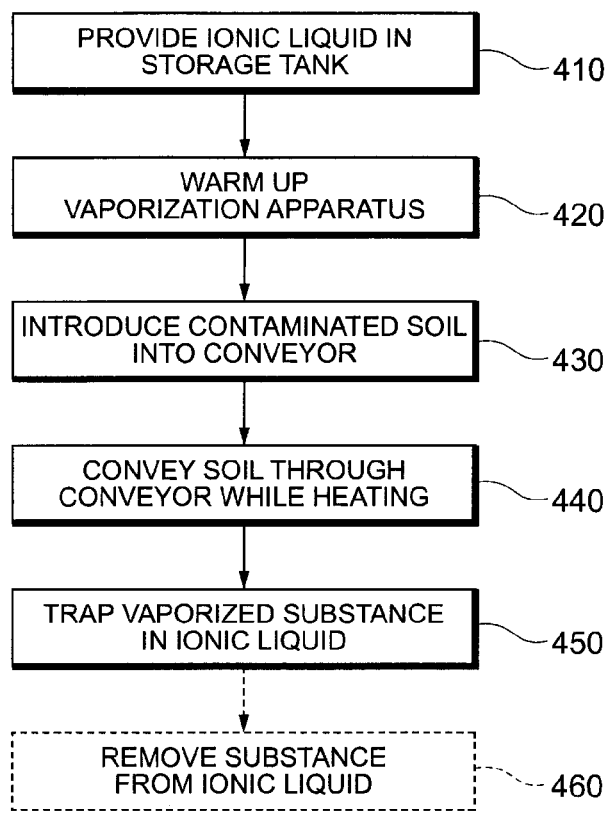
FIG. 4 is a flow chart illustrating an example of a soil remediation method that is arranged for a soil remediation system in accordance with the present disclosure.

FIG. 4 is a flow chart illustrating an example of a soil remediation method that is arranged for a soil remediation system in accordance with the present disclosure. The method may be performed under control of the computing device 300 of the soil re-mediation system 100.

Referring to FIG. 4, in an operation 410, a predetermined amount of the ionic liquid is provided in the storage tank 120. In an operation 420, the vaporization apparatus 110 is warmed up. Specifically, the conveyor screw 1142 of the conveyor 111 starts to rotate at a predetermined rate, and an AC power with a predetermined frequency is applied to the work coil 1121. In an example, the rotation rate of the conveyor screw 1142 may be selected so that the flow rate of the soil is about 0.1 meter/minute. Further, the power output of about 3000 kW and the frequency of AC of about 3 kHz may be applied. In some embodiments, the pre-heating device may also be driven. Further, the carrier gas sufficient to fill the inside of the conveyor body 114 is supplied to the conveyor body. In an example, the carrier gas of about 200 mL/minute may be supplied. In addition, the cooling medium may be circulated through the work coil. After the completion of the warm-up, in an operation 430, a contaminated soil which may contain at least one volatile compound is introduced into the entry port 113 of the conveyor 111. In an operation 440, the soil is conveyed through the conveyor body 114 on heating by the heating device 112. In this operation, the volatile compound depending on the heating temperature may be vaporized and sent out to the storage tank 120 via the pipe 106, together with the carrier gas. In the meantime, the remedied soil is discharged from the discharged port 115. In an operation 450, the vaporized volatile substances delivered to the storage tank 120 through the pipe 106 is trapped and dissolved in the ionic liquid. By way of the above remediation process, the contaminated soil has been remedied, while the volatile compound is collected in the ionic liquid. After the above remediation process, in an operation 460, the ionic liquid which dissolves the volatile compound therein is optionally fed to the distillation apparatus 130, and the volatile compound is distilled off from the ionic liquid.

Figure 5:
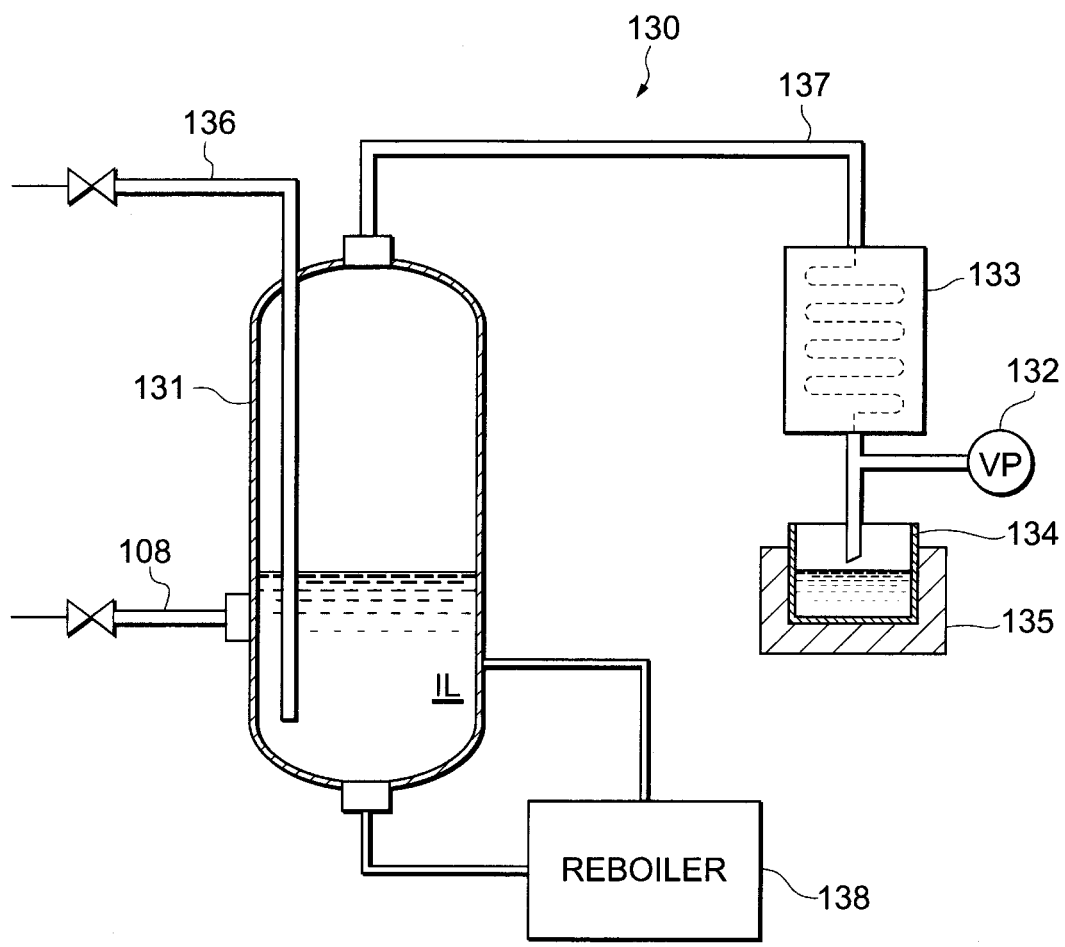
FIG. 5 is a schematic illustration showing an example of a distillation apparatus of a soil remediation system arranged in accordance with the present disclosure.

FIG. 5 is a schematic illustration showing an example of the distillation apparatus 130 of the soil remediation system 100 arranged in accordance with the present disclosure. Depending on the desired configuration, the distillation apparatus may be of any type including, for example, a simple distillation, a fractional distillation (rectification) apparatus, a steam distillation apparatus, and a vacuum distillation apparatus. For illustrative purposes only, the distillation apparatus 130 is shown and described as a vacuum distillation apparatus.

Referring to FIG. 5, the distillation apparatus 130 may include a distillation column 131, a vacuum pump 132, a condenser 133, a recovery tank 134, and a refrigeration device 135. The distillation column 131 is configured to contain the ionic liquid. The ionic liquid may be fed from the storage tank 120 via a pipe 108. In an example, a bubbling pipe 136 may be arranged to extend into the distillation column 131. The bubbling pipe 136 may communicate with the gas supplier 118 (see also FIG. 1). In a bubbling process, a bubbling gas (e.g., a nitrogen gas) is fed via the bubbling pipe 136 into the ionic liquid contained in the distillation column 131. The distillation column 131 includes an outlet located at an upper portion thereof, and a pipe 137 is hermetically connected to the outlet. The pipe 137 extends to the recovery tank 134 via the condenser 133. The vacuum pump 132 is operatively connected with the distillation column 131 via the pipe 137 and configured to in part reduce the internal pressure of the distillation column 131. By way of reducing the internal pressure of the distillation column 131, the volatile substance dissolved in the ionic liquid may be vaporized, and the vaporized volatile substance may be introduced into the condenser 133 via the pipe 137. The condenser 133 is configured to condense the vaporized volatile substance into its liquid phase. The condenser 133 may include a cooling device (not shown). The liquid-phase volatile substance is introduced into the recovery tank 134. The recovery tank 134 may be refrigerated by the refrigeration device 135. The refrigeration device may include a cooling medium such as liquid nitrogen. Depending on the nature of the volatile substance, the recovery column 134 may contain the volatile substance in the liquid phase or solid phase. The recovered volatile substance may be reused, recycled, or disposed. Further, the residual ionic liquid may also be reused or recycled.

In another example, the distillation apparatus 130 may further include a reboiler 138 configured to heat the ionic liquid at a predetermined temperature in order to facilitate the distillation process.

Further, the distillation apparatus 130 may be adapted for fractional distillation to separate different substances from the ionic liquid. The distillation apparatus 130 may include a configuration capable of repeating vaporization-condensation cycles. For example, the distillation column 131 may include trays or packings arranged therein.

Figure 6:
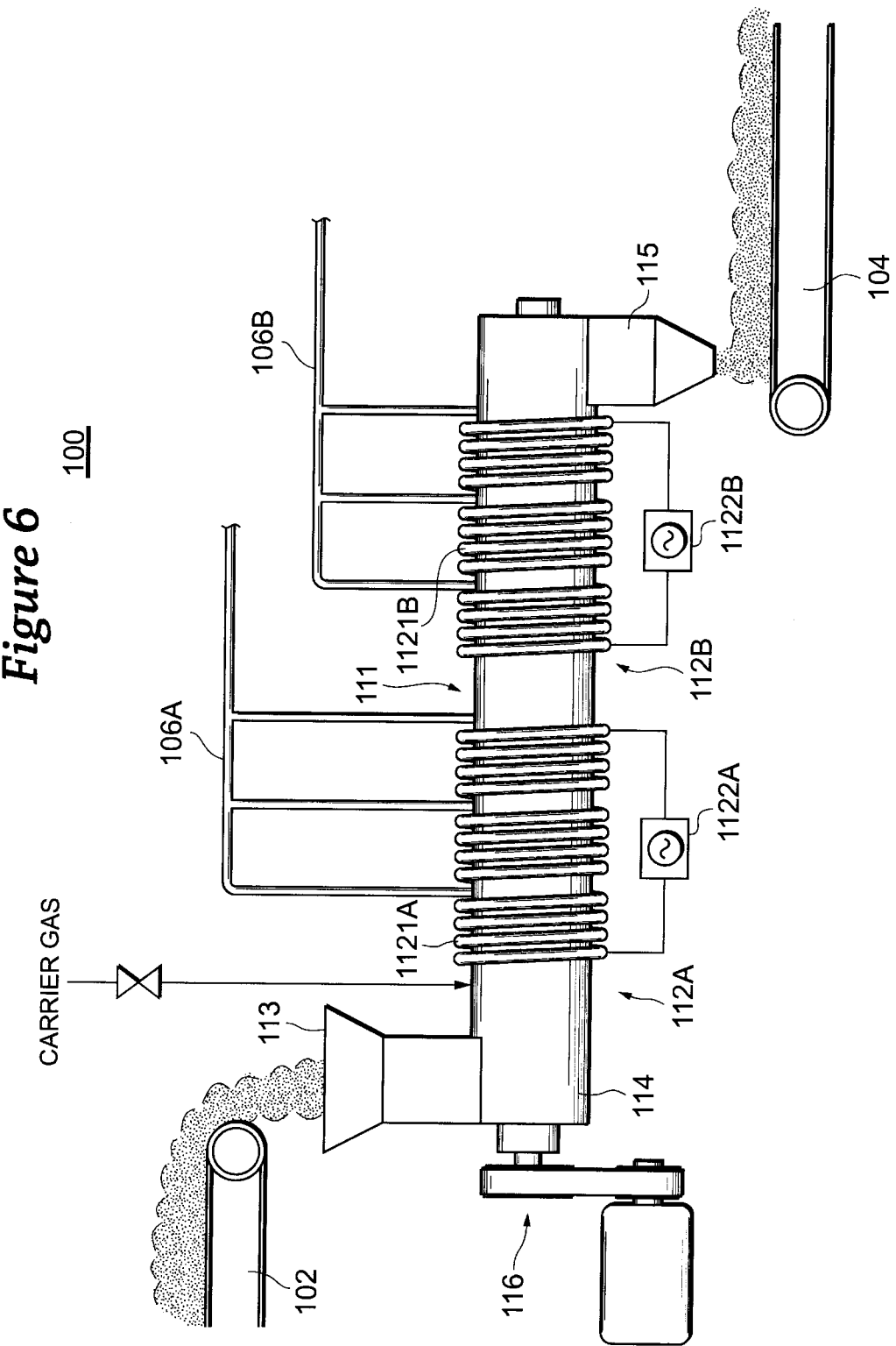
FIG. 6 is a schematic illustration of another example of a soil remediation system arranged in accordance with the present disclosure.

In some embodiments, the soil remediation system 100 may be adapted for repeating heating-trapping cycles. FIG. 6 is a schematic illustration of another example of a soil remediation system 100 arranged in accordance with the present disclosure. As shown in FIG. 6, the soil remediation system 100 may include a plurality of heating devices 112A and 112B to extract multiple volatile substances based on differences in their volatilities. In a similar configuration to that of FIG. 1, each heating device 112A and 112B may include a corresponding work coil 1121A and 1121B as well as corresponding AC power source 1122A and 1122B. While FIG. 6 shows two heating devices, any multiple number of heating devices may be used, such as 2, 3, 4, 5, 6, and so on. The plurality of the heating devices 112A and 112B may be installed on the conveyor body 114 along the conveying direction of the conveyor 111. The plurality of the heating devices 112A and 112B may be configured to heat the soil at different temperatures depending on the boiling points of the multiple volatile substances. The plurality of heating devices may be arranged such that the soil is exposed to lower temperatures at the beginning of the conveyor body, and higher temperatures at the end of the conveyor body. The multiple heating devices may be connected to multiple storage tanks, each containing the same or different ionic liquids. The computing device 300 may control the plurality of the heating devices 112A and 112B independently. In an example, in a case where the volatile substances are 1,2-dichloroethane whose boiling point is 83.5 degrees Celsius and 1,1,2-trichloroethane whose boiling point is 114 degrees Celsius, the heating temperatures of the plurality of heating devices 112A and 112B are selected at about 100 degrees Celsius and 150 degree Celsius, respectively.

Although not shown in FIG. 6, the storage tank or storage tanks 110 may be provided depending on the characteristics of an ionic liquid or ionic liquids. The ionic liquid of, for example, 1-butyl-3-methylimidazolium bis(trifluoromethylsulfonyl) imide may absorb both of 1,2-dichloroethane and 1,1,2-trichloroethane, and thus the conveyor body 114 may communicate with a single storage tank 120 via the pipes 106A and 106B. Alternatively, two different storage tanks 120 may be used to separately contain the two volatile substances.

Figure 7:
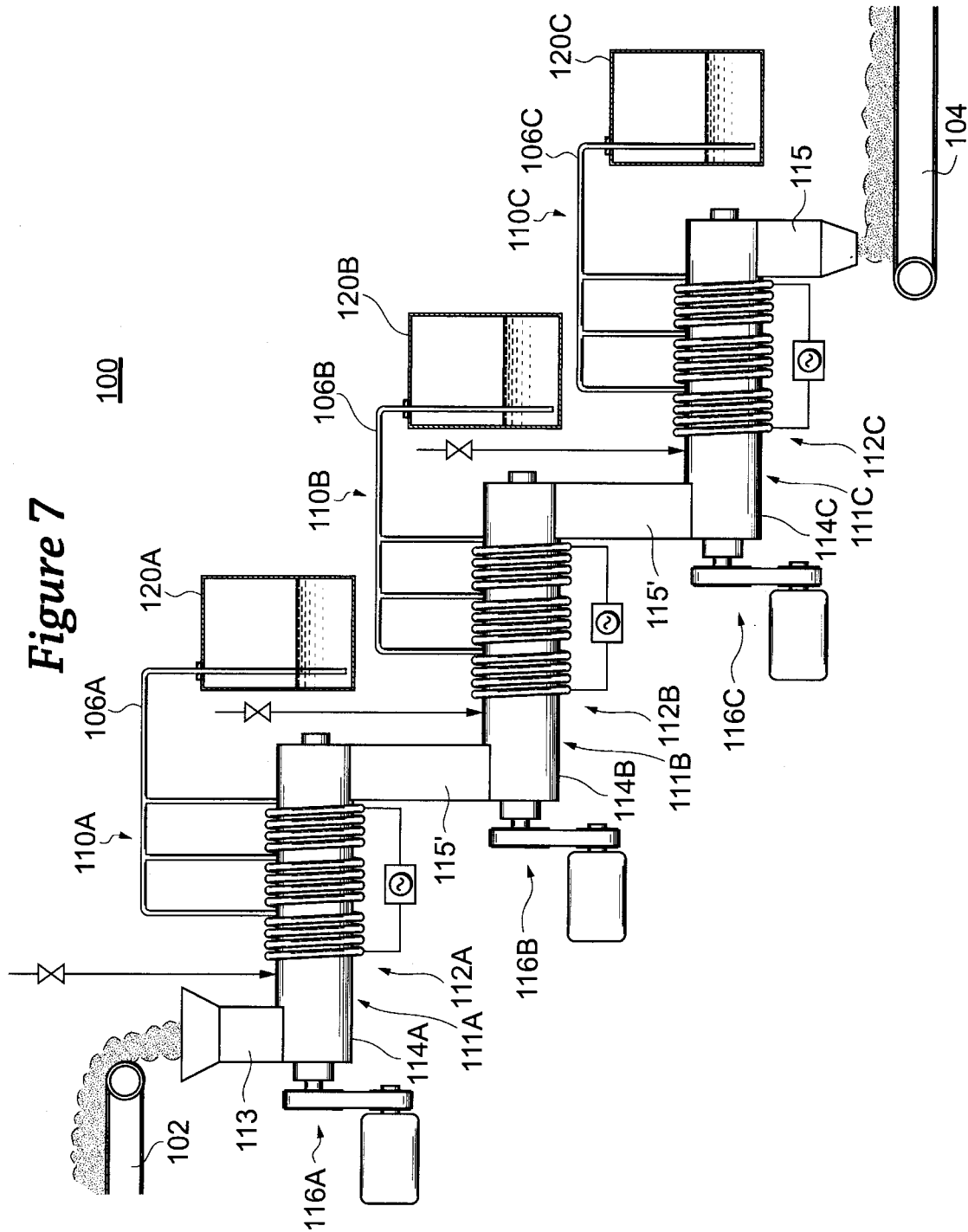
FIG. 7 is a schematic illustration of yet another example of a soil remediation system arranged in accordance with the present disclosure.

FIG. 7 is a schematic illustration of yet another example of a soil remediation system 100 arranged in accordance with the present disclosure. The soil remediation system 100 shown in FIG. 7 may include a plurality of vaporization apparatuses 110A-110C arranged in series. In this example, the conveyor bodies 114A-114C adjacent to each other may be connected via the chutes 115', respectively. The conveyor bodies 114A-114C may generally be connected by any type of connector, such as chutes or conveyor belts. Thus, the soil can be conveyed through the conveyors 111A-111C without exposure to the atmosphere. In another example, opening and closing hatches may be located in the connector. The hatch may prevent the volatile substance from diffusing into the adjacent conveyor bodies. The computing device 300 may control opening and closing of the hatch in accordance with the progress of heating of the soil. Each of the plurality of vaporization apparatuses 110A-110C may include the same basic configuration as discussed above. The computing device 300 (not shown in FIG. 7) may control the power transmission mechanisms 116A-116C so as to drive the conveyor 111A-111C in synchronization. Also, the computing device 300 may control the heating devices 112A-112C independently so that they heat the soil at the different temperatures depending on target substances. In an example, the heating temperatures of the heating devices 112A-112C may be selected at about 100 degrees Celsius, at about 150 degrees Celsius, and at about 200 degrees Celsius, respectively. At least one substance vaporized in each of the conveyor bodies 114A-114C by the heating devices 112A-112C may be introduced to the storage tanks 120A-120C via pipes 106A-106C. As discussed above, depending on the characteristics of the ionic liquids relative to the target substances, a plurality of vaporized volatile substances may be introduced to a single storage tank. The multiple storage tanks may contain the same or different ionic liquids. While FIG. 7 is drawn with three conveyor bodies, any number of conveyor bodies may be connected, such as 2, 3, 4, 5, 6, and so on.

As a result of various configurations described in detail above, the soil remediation system and method arranged in the present disclosure is capable of remedying contaminated soil, while vaporizing at least one volatile compound from the soil and trapping it by an ionic liquid. Further, the at least one volatile compound may be subsequently separated from the ionic liquid by distillation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A soil remediation system for removing at least one contaminating substance from soil, the system comprising:
   a conveyor including an enclosure and configured to convey soil for remediation through the enclosure;
   a heating device configured to heat the soil conveyed in the enclosure to a temperature sufficient for vaporization at atmospheric pressure of the contaminating substance contained in the soil to produce an exhaust gas containing the vaporized substance;
   a storage tank in gas connection with the enclosure and configured to receive the exhaust gas containing the vaporized substance;
   an ionic liquid disposed within the storage tank to contact the exhaust gas containing the vaporized substance, wherein the ionic liquid is configured to trap the vaporized substance within the ionic liquid and remove the substance from the exhaust gas as the exhaust gas passes through the ionic liquid;

a conducting tubing having at least a first end connected with the enclosure and a second end disposed within the ionic liquid to convey the exhaust gas containing the vaporized substance from the enclosure to the storage tank and into the ionic liquid; and a temperature maintaining device configured to maintain for maintaining the temperature of the exhaust gas vaporized substance in the conducting tubing at a temperature greater than the vaporization temperature of the vaporized substance in the exhaust gas.

2. The soil remediation system according to claim 1, wherein the heating device comprises an induction heating device disposed about at least a portion of the enclosure and configured to induce heat electromagnetically.

3. The soil remediation system according to claim 1, further including a sparger disposed at the second end of the conducting tubing to introduce bubbles of the exhaust gas containing the vaporized substance into the ionic liquid.

4. The soil remediation system according to claim 1, further comprising a gas supplier configured to supply a carrier gas to the enclosure, wherein the exhaust gas comprises the carrier gas mixed with the vaporized substance.

5. The soil remediation system according to claim 4, wherein the carrier gas comprises nitrogen and the gas supplier comprises a heating device for heating the carrier gas.

6. The soil remediation system according to claim 1, further comprising:
   a pre-heating device configured to pre-heat the soil to a temperature below the boiling temperature of the substance contained in the soil; and
   a distillation apparatus configured to distill the substance trapped in the ionic liquid from the ionic liquid, the distillation apparatus comprising:
      a distillation column configured to vaporize the trapped substance,
      a condenser configured to liquefy the vaporized substance from the distillation column, and
      a refrigeration device configured to maintain the liquefied substance in the liquid state.

7. The soil remediation system according to claim 1, wherein the ionic liquid comprises at least one salt selected from the group consisting of imidazolium salt, pyridinium salt, pyrrolidinium salt, ammonium salt, and phosphonium salt.

8. The soil remediation system according to claim 1, wherein the ionic liquid comprises at least one salt selected from a group consisting of:
   1-butyl-3-methylimidazolium hexafluorophosphate,
   1-butyl-3-methylimidazolium bis(trifluoromethylsulfonyl)imide,
   1-hexyl-3-methylimidazolium hexafluorophosphate,
   1-hexyl-3-methylimidazolium tetrafluoroborate,
   1-hexyl-3-methylimidazolium trifluoromethanesulfonate,
   1-hexyl-3-methylimidazolium bis(trifluoromethylsulfonyl)imide,
   1-octyl-3-methylimidazolium hexafluorophosphate,
   1-octyl-3-methylimidazolium tetrafluoroborate,
   1-butyl-2,3-dimethylimidazolium tetrafluoroborate,
   1-butyl-2,3-dimethylimidazolium trifluoromethanesulfonate,
   1-hexyl-2,3-dimethylimidazolium tetrafluoroborate,
   1,3-diallylimidazolium bis(trifluoromethylsulfonyl)imide,
   1-butylpyridinium tetrafluoroborate,
   1-hexylpyridinium tetrafluoroborate,
   1-butyl-1-methylpyrrolidinium bis(trifluoromethylsulfonyl)imide,
   1-butyl-1-methylpyrrolidinium trifluoromethanesulfonate,
   N,N,N,N-dimethyl-methyl-2-methoxyethylammonium tetrafluoroborate, and
   tricyclohexyl(tetradecyl)phosphonium bis(trifluoromethylsulfonyl)imide.

9. The soil remediation system according to claim 1, further comprising a distillation apparatus configured to distill off the substance trapped in the ionic liquid, the distillation apparatus comprising:
   a distillation column configured to vaporize the trapped substance in the ionic liquid to produce a vaporized substance,
   a condenser configured to liquefy the vaporized substance from the distillation column to produce a liquefied substance, and
   a refrigeration device configured to maintain the liquefied substance in the liquid state.

10. The soil remediation system according to claim 1, wherein the temperature maintaining device comprises at least one of a heater and thermal insulation.

11. A soil remediation system for removing contaminating substances from soil, the system comprising:
   a conveyor including an enclosure and configured to convey soil for remediation through the enclosure;
   a plurality of heating devices consecutively disposed along portions of the enclosure, with the plurality of heating devices being configured to heat the soil conveyed in the enclosure to consecutively higher temperatures to respectively vaporize at atmospheric pressure different substances contained in the soil to produce respective exhaust gases containing the different vaporized substances;
   a plurality of storage tanks, with at least one storage tank in gas connection with each of the respective portions of the enclosure and the heating devices associated therewith to receive the respective exhaust gases containing the different vaporized substances;
   an ionic liquid disposed within each of the plurality of storage tanks to contact the respective exhaust gases containing the different vaporized substances received in the storage tanks, wherein each of the ionic liquids is adapted to trap the respective different vaporized substances within the ionic liquids and remove the substance from the respective exhaust gases as the exhaust gases pass through the ionic liquids;
   a conducting tubing interconnecting each of the plurality of storage tanks with a respective portion of the enclosure, and each conducting tubing having at least a first end connected with the respective portion of the enclosure and a second end disposed within the ionic liquid in the respective storage tanks to convey the exhaust gases containing the different vaporized substance from the respective portion of the enclosure to the respective storage tank and into the ionic liquid;
   a temperature maintaining device associated with the conducting tubings for maintaining the temperature of the exhaust gases containing the different vaporized substance being conveyed in the conducting tubings at a temperature greater than the vaporization temperature of the vaporized substances in the respective exhaust gas; and
   a sparger disposed at the second end of each conducting tubing to introduce bubbles of the exhaust gas into the ionic liquid.

12. The soil remediation system according to claim 11, wherein at least one of the plurality of the heating devices comprises an induction heating device configured to induce heat electromagnetically.

13. The soil remediation system according to claim 11, further comprising:
   a gas supplier configured to supply a carrier gas to the hollow duct, the gas supplier comprising a device for heating the carrier gas;
   a temperature maintaining device for maintaining the temperature of the vaporized substances being conveyed in the conducting tubings at a temperature greater than the vaporization temperature of the vaporized substances; and
   a distillation apparatus configured to distill the substance trapped in the ionic liquid from the ionic liquid, the distillation apparatus comprising:
      a distillation column configured to vaporize the trapped substance,
      a condenser configured to liquefy the vaporized substance from the distillation column, and
      a refrigeration device configured to maintain the liquefied substance in the liquid state.

14. A soil remediation system for removing contaminating substances from soil, the system comprising:
   a plurality of consecutively disposed conveyors each including an enclosure and each configured to convey soil for remediation through the enclosure, wherein the plurality of conveyors are operatively connected in series;
   at least one heating device associated with each enclosure and configured to heat the soil conveyed in the respective enclosures to respective consecutively higher temperatures to respectively vaporize at atmospheric pressure different substances contained in the soil to produce respective exhaust gases containing the different vaporized substances;
   a plurality of storage tanks, with at least one storage tank in gas connection with each of the respective enclosures of the conveyors associated therewith to receive the respective exhaust gases containing the different vaporized substances;
   an ionic liquid disposed within each of the plurality of storage tanks to contact the respective exhaust gases containing the different vaporized substances received in the storage tanks, wherein the ionic liquids are adapted to trap the respective different vaporized substances within the ionic liquids and remove the substance from the respective exhaust gases as the exhaust gases pass through the ionic liquid;
   a conducting tubing interconnecting each of the plurality of storage tanks with a respective enclosure, and each conducting tubing having at least a first end connected with the respective enclosure and a second end disposed within the ionic liquid in the respective storage tanks to convey the exhaust gases containing the different vaporized substances from the respective portion of the enclosure to the respective storage tank and into the ionic liquid; and
   a temperature maintaining device associated with the conducting tubings, wherein the temperature maintaining device is configured to maintain the temperature of the exhaust gases containing the different vaporized substances being conveyed in the conducting tubings at a temperature greater than the vaporization temperature of the vaporized substances in the respective exhaust gas.

15. The soil remediation system according to claim 14, wherein:
   the temperature maintaining device comprises at least one of a heater and thermal insulation; and
   at least one of the plurality of the heating devices comprises an induction heating device configured to induce heat electromagnetically.

16. The soil remediation system according to claim 14, further comprising:
   a gas supplier configured to supply a carrier gas to the hollow duct of the at least one of the plurality of conveyors, the gas supplier comprising a device for heating the carrier gas;
   a sparger disposed at the second end of each conducting tubing to bubble the vaporized substance into the ionic liquid; and
   a distillation apparatus configured to distill the substance trapped in the ionic liquid from the ionic liquid, the distillation apparatus comprising:
      a distillation column configured to vaporize the trapped substance,
      a condenser configured to liquefy the vaporized substance from the distillation column to a liquid state, and
      a refrigeration device configured to maintain the liquefied substance in the liquid state.

17. A soil remediation system for removing contaminating substances from soil, the system comprising:
   a plurality of remediation subsystems, wherein each of the plurality of soil remediation subsystems comprises:
      a conveyor including an enclosure and configured to convey soil for remediation through the enclosure;
      a heating device configured to heat the soil conveyed in the enclosure to a temperature sufficient for vaporization at atmospheric pressure of at least one contaminating substance contained in the soil to produce an exhaust gas containing the at least one vaporized substance;
      a storage tank in gas connection with the enclosure and configured to receive the exhaust gas containing the at least one vaporized substance;
      an ionic liquid disposed within the storage tank to contact the exhaust gas containing the at least one vaporized substance, wherein the ionic liquid is configured to trap the at least one vaporized substance within the ionic liquid and remove the at least one vaporized substance from the exhaust gas as the exhaust gas passes through the ionic liquid;
      a conducting tubing having at least a first end connected with the enclosure and a second end disposed within the ionic liquid to convey the exhaust gas containing the at least one vaporized substance from the enclosure to the storage tank and into the ionic liquid;
      a temperature maintaining device configured to maintain the temperature of the exhaust gas in the conducting tubing at a temperature greater than the vaporization temperature of the at least one vaporized substances in the exhaust gas; and
      a sparger disposed at the second end of the conducting tubing to introduce bubbles of the exhaust gas into the ionic liquid; and
   wherein: (a) the conveyors of the plurality of soil remediation subsystems are operatively coupled in series; and (b) the heating device of each of the plurality of remediation subsystems is configured to heat the soil to a different temperature.

18. A soil remediation method for removing at least one contaminating substance from soil, the method comprising:
- providing an ionic liquid in a container having a top and bottom, the ionic liquid being configured for trapping the at least one substance in the ionic liquid;
- heating the soil to a temperature sufficient to vaporize at atmospheric pressure the substance and produce an exhaust gas containing the at least one vaporized substance;
- conducting the exhaust gas containing the at least one vaporized substance to the container;
- maintaining the temperature of the exhaust gas during the conducting at a temperature greater than the vaporization temperature of the at least one vaporized substance to prevent condensation of the at least one substance; and
- dispersing the exhaust gas as bubbles into the ionic liquid adjacent the bottom of the container for passage upwardly through the ionic liquid to trap the at least one vaporized substance in the ionic liquid as the bubbles pass upwardly through the ionic liquid.

19. The soil remediation method according to claim 18, wherein:
- the heating includes electromagnetic induction heating; and
- the dispersing the vaporized substance as bubbles comprises sparging.

20. The soil remediation method according to claim 18, further comprising supplying a carrier gas to the soil so as to carry the gaseous substance to the ionic liquid.

21. The soil remediation method according to claim 20, wherein the substance has a boiling temperature at which the substance vaporizes, and the method further comprises at least one of pre-heating the carrier gas, and pre-heating the soil at a temperature below the boiling temperature of the substance contained in the soil.

22. The soil remediation method according to claim 18, further comprising extracting the substance from the ionic liquid after the trapping step.

23. The soil remediation method according to claim 18, further comprising:
- repeating the heating step at consecutively higher temperatures to vaporize additional ones of the substances contained in the soil;
- contacting each vaporized substance with a respective ionic liquid adapted to trap the substance; and
- trapping the different vaporized substances by the respective ionic liquids.

24. The soil remediation method according to claim 23, further comprising distilling the ionic liquid containing the trapped substance to remove the substance from at least one of the ionic liquids after at least one of the trapping steps.

* * * * *

UNITED STATES PATENT AND TRADEMARK OFFICE
CERTIFICATE OF CORRECTION

PATENT NO.         : 9,004,817 B2
APPLICATION NO.    : 13/142372
DATED              : April 14, 2015
INVENTOR(S)        : Hanasaka Page 1 of 1

It is certified that error appears in the above-identified patent and that said Letters Patent is hereby corrected as shown below:

On the Title Page

On Page 2, in Item (56), under "OTHER PUBLICATIONS", in Column 2, Line 9, delete "Heating SPC" and insert -- Heating, SPC --, therefor.

On Page 2, in Item (56), under "OTHER PUBLICATIONS", in Column 2, Line 14, delete "http://www.dhf.co/jp.eng/ih/products/fine-particle.html," and insert -- http://www.dhf.co/jp/eng/ih/products/fine-particle.html, --, therefor.

In the Specification

In Column 4, Line 63, delete "($0_2$)" and insert -- ($O_2$) --, therefor.

In the Claims

In Column 11, Line 7, in Claim 1, delete "for maintaining the temperature" and insert -- the temperature --, therefor.

In Column 11, Line 8, in Claim 1, delete "vaporized substance in the" and insert -- in the --, therefor.

Signed and Sealed this
Twenty-ninth Day of September, 2015

Michelle K. Lee
*Director of the United States Patent and Trademark Office*